United States Patent
Gross et al.

(10) Patent No.: US 6,218,961 B1
(45) Date of Patent: Apr. 17, 2001

(54) METHOD AND SYSTEM FOR PROXIMITY DETECTION AND LOCATION DETERMINATION

(75) Inventors: Eric Gross, Melbourne; Anthony J. Guarino, Winter Springs; Scott Easterling, Malabar; Ernest Peek, Cocoa; Charles L. Zahm, Indialantic; Leonard R. Reinhart, Melbourne Beach; Michael S. Gottfried, Palm Bay, all of FL (US)

(73) Assignee: G.E. Harris Railway Electronics, L.L.C., Melbourne, FL (US)

( * ) Notice: Subject to any disclaimer, the term of this patent is extended or adjusted under 35 U.S.C. 154(b) by 0 days.

(21) Appl. No.: 09/027,256

(22) Filed: Feb. 20, 1998

Related U.S. Application Data

(63) Continuation-in-part of application No. 08/733,963, filed on Oct. 23, 1996, now Pat. No. 5,867,122.

(60) Provisional application No. 60/034,210, filed on Mar. 3, 1997, and provisional application No. 60/038,889, filed on Feb. 21, 1997.

(51) Int. Cl.[7] .................................................. G08G 1/16
(52) U.S. Cl. .................. 340/903; 340/566; 340/902; 340/905; 340/988; 246/3; 246/122 R; 246/126; 246/166.1
(58) Field of Search ........................ 340/903, 902, 340/905, 425.5, 566, 539, 991, 988, 990; 246/3, 122 R, 121, 166, 166.1, 167 R, 125, 124, 126; 701/19, 117; 342/455

(56) References Cited

U.S. PATENT DOCUMENTS

| | | | | |
|---|---|---|---|---|
| 4,235,402 | | 11/1980 | Matty et al. | 701/20 |
| 4,578,665 | * | 3/1986 | Yang | 340/566 |
| 4,731,613 | | 3/1988 | Endo et al. | 342/357.14 |
| 4,835,537 | | 5/1989 | Manion | 342/30 |
| 4,864,306 | * | 9/1989 | Wiita | 342/42 |
| 4,896,580 | * | 1/1990 | Rudnicki | 89/1.815 |
| 5,072,900 | * | 12/1991 | Malon | 246/5 |
| 5,129,605 | | 7/1992 | Burns et al. | 246/5 |
| 5,153,836 | | 10/1992 | Fraughton et al. | 701/301 |
| 5,332,180 | * | 7/1994 | Peterson et al. | 246/3 |
| 5,357,438 | | 10/1994 | Davidian | 701/301 |
| 5,367,463 | | 11/1994 | Tsuji | 701/216 |
| 5,416,712 | | 5/1995 | Geier et al. | 701/216 |
| 5,429,329 | * | 7/1995 | Wallace et al. | 246/166 |
| 5,452,211 | | 9/1995 | Kyrtsos et al. | 701/215 |
| 5,541,845 | | 7/1996 | Klein et al. | 701/207 |
| 5,554,982 | | 9/1996 | Shirkey et al. | 340/903 |
| 5,574,469 | | 11/1996 | Hsu | 342/455 |
| 5,620,155 | | 4/1997 | Michalek | 246/121 |
| 5,623,244 | * | 4/1997 | Cooper | 340/425.5 |
| 5,623,413 | | 4/1997 | Matheson et al. | 701/117 |
| 5,627,508 | * | 5/1997 | Cooper et al. | 340/425.5 |
| 5,657,232 | | 8/1997 | Ishikawa et al. | 701/215 |
| 5,682,139 | | 10/1997 | Pradeep et al. | 340/539 |
| 5,740,547 | | 4/1998 | Kull et al. | 701/19 |
| 5,757,291 | | 5/1998 | Kull | 340/988 |
| 5,781,119 | * | 7/1998 | Yamashita et al. | 340/903 |

* cited by examiner

*Primary Examiner*—Daniel J. Wu
*Assistant Examiner*—Davetta W. Goins
(74) *Attorney, Agent, or Firm*—Rogers & Killeen

(57) ABSTRACT

A system and method for preventing collisions between vehicles, such as railway vehicles, by exchanging data regarding track position of the vehicles. By use of an on-board track database, the system provides an indication of the distance between vehicles based not on line-of-sight but on track distance. Additionally, a system and method for accurately determining location of railway vehicles without the use of a network of trackside indicators. The disclosed system uses a gyro, position indicator, and a satellite position determination along with a track database to maintain highly accurate estimates of measurement errors and track position.

21 Claims, 9 Drawing Sheets

PDD

PDD PROCESSOR 200

| ID | MP | TRAK | DIST | D | T | SP | ST | AGE |
|----|----|----|----|----|----|----|----|----|
| 400 | | | | | | | | |
| 400 | | | | | | | | |
| 400 | | | | | | | | |
| 400 | | | | | | | | |
| | | | | | | | | |
| 405 | | | | | | | | |

PDD DISPLAY UNIT 210

*FIGURE 3*

Velocity Filter 645

METHOD AND SYSTEM FOR PROXIMITY DETECTION AND LOCATION DETERMINATION

This application is a continuation-in-part of U.S. application Ser. No. 08/733,963, filed Oct. 23, 1996, now U.S. Pat. No. 5,867,122, and claims the benefit of U.S. Provisional Application Ser. No. 60/038,889, filed Feb. 21, 1997, and U.S. Provisional Application Ser. No. 60/034,210, filed Mar. 3, 1997.

BACKGROUND OF THE INVENTION

The present application is related generally to systems and methods for preventing collisions between vehicles on railway systems and, in particular, to systems and methods for determining accurate locations of railway vehicles and/or for providing proximity warnings or brake applications when a collision threat is detected.

A long standing problem in the railway industry has been the competing interests of maximizing throughput on the railway system while maintaining sufficient separation of the vehicles to prevent collisions. Significant time and resources have been expended towards developing proximity detecting systems which alert vehicle operators to potential collision threats. The typical proximity detection system includes the capability of the system to take automatic action to stop the vehicle should the operator not take the required action in response to a proximity warning.

Generally, in such prior art systems the location, speed, direction of travel and identification number of each vehicle is collected. This information may then be analyzed to determine which vehicles present a collision threat to one another. Once a vehicle is determined to be a collision threat, the proximity detecting systems will issue a proximity warning once the trains come within a predetermined threshold distance to each other. For example, if a train is travelling northbound on a track towards point A and a second train is travelling southbound on the same track to point A, a prior art proximity detecting system would issue a proximity warning to each train as the trains got within a certain distance of one another. Similarly, if two trains were travelling on the same track in the same direction and the trailing train was travelling at a faster speed than the lead train, a proximity warning would be issued when the distance between the two trains decreased to a certain predetermined threshold distance.

A common characteristic of the prior art proximity detection systems is the automatic enforcement braking if the proximity warning is not acknowledged by the operator. For example, many prior art collision avoidance systems require that the operator acknowledge the receipt of the proximity warning within a certain amount of time or the proximity detection system initiates enforcement braking to cause the train to come to a complete stop.

Some prior art proximity detection systems require more than mere acknowledgement of the proximity warning. For example, one such prior art system requires the operator of the train receiving the proximity warning to establish voice communications with the identified collision threat train in order to satisfy the warning acknowledgement and prevent automatic braking of the train. See, for example, the Hsu U.S. Pat. No. 5,574,469 issued Nov. 12, 1996.

Another general characteristic of many of the prior art proximity detection systems is that there may be more than one predetermined threshold distance. For example, when two vehicles are determined to be a collision threat and come within some predetermined threshold distance, a proximity warning is issued to each vehicle. If the distance between the trains should subsequently decrease to a second predetermined threshold distance, a second proximity warning may be given. This second proximity warning may have associated with it some additional required action of the operator. For example, an operator of a train may receive a proximity warning when it is determined that his train and another train pose a potential collision threat to each other and the distance between the two trains has decreased to eight miles. The operator may be required to acknowledge the alarm by depressing an acknowledgement button. If the acknowledgement button is not depressed within a set amount of time of receiving the alarm, the train may initiate proximity enforcement braking commands automatically. If the operator acknowledges the proximity alarm but the distance between the two trains decreases to five miles, a second proximity warning may be issued. This second warning may have associated with it, required action from the operator in addition to acknowledging the alarm, such as reducing the speed of the train. In a similar manner, there may be multiple predetermined threshold distances each with an associated required operator action in order to prevent the proximity detecting system from initiating enforcement braking commands to slow the train.

In order to prevent continuous unwanted alarms and enforcement actions in an area where trains are commonly within the proximity warning threshold (i.e., railyards) it is common for the prior art systems to offer a method of allowing the operator to manually disable the proximity detection system. However, the ability to disable the proximity detection system may lead to the inadvertent disablement of the system when the train leaves an area of congestion. Additionally, because of the severity of the resulting action if a proximity alarm is not acknowledged, there may also be situations when the vehicle operator would prefer to receive a proximity warning but would want to prevent an enforcement action.

A significant decrease in the net worth of a proximity detection system occurs if the system can not minimize false alarms. This is particularly true if the false alarm leads to an enforcement action which may have ramifications to the schedules of the entire railway system. For example, a vehicle that is following another vehicle at approximately the same speed and at a distance approximately equal to one of the predetermined threshold distances may cause a proximity alarm if the vehicle closes to less than the threshold distance. The alarm may clear if the trailing vehicle falls beyond the threshold distance. If the trailing vehicle subsequently closes within the threshold distance again a second proximity alarm would then be received. Without some method of screening out those situations where a continuous alarm may be expected, the operator may become desensitized to the importance of the proximity alarm. As a result, the operator may not acknowledge the "expected" alarm, inadvertently resulting in an enforcement action and unscheduled stopping of the vehicle.

Inherent in the operation of railed vehicles is conflict with not only other vehicles on the railway system but also non-railway system vehicles whose path may cross the path of a vehicle system on a railway (i.e., a railway crossing which allows automobiles to cross over the train tracks). Various systems have been developed which will warn the non-railway vehicle of the impending approach of the railway system vehicle.

Generally, in such prior art systems, a wayside centric approach is taken to warn vehicles of an approaching train.

For example, a train may continuously transmit a signal at a predetermined signal strength along the direction of movement of the train. Wayside receivers located at the railway crossing will receive the signal as the train approaches the crossing. When the signal is received, the wayside unit may cause warning bells to ring, or warning lights to activate or crossing gates to close (or any combination of the three). Upon seeing and/or hearing the warning signals, an operator of a non-railway vehicle will know a train is approaching the crossing. While this warning system has proven effective at rail crossings, it is not an effective method of preventing collisions between vehicles where both vehicles are travelling on the same track. For instance, one characteristic of the prior art warning systems of this type, is that the actual location of the train is not determined nor utilized. Rather the relative location of the train with respect to the crossing is instrumental in activating the warning system. The warning signal transmitted by the train is usually a fixed signal of sufficient range to take into account expected propagation losses such that even in a worst case propagation loss environment, the warning signals will be activated in sufficient time to warn and/or prevent non-railway system vehicles from colliding with the train at the crossing.

Unlike the previously described proximity warning systems which are utilized to warn non-railway system vehicles of the approach of a railway vehicle, a proximity detection system that prevents collisions between railway system vehicles requires the accurate determination of location of each vehicle in the railway system. A system that can not accurately determine the location of the vehicles, will be forced to factor in a large margin error to ensure that collisions do not occur and as a result the vehicles will be spaced more than they need to be, thereby reducing throughput on the railway system.

It is known in prior art railway proximity warning systems for the system to display to the operator of the locomotive the location of the locomotive, and of other potentially conflicting locomotives. Generally, such locations are determined and displayed in geographic coordinates, such as latitude and longitude. In some situations, the system may also display the distance between the various locomotives, often calculating the distance based on the signal strength of the location signals received from other locomotives or from the geometric relationship between the geographic coordinates of the locomotives. Use of signal strength as the measure of distance between locomotives is often beset with varying signal transmission difficulties which may make more difficult an accurate determination of the actual distance between the locomotives. Moreover, in both signal strength and geometric calculations, the measure of the distance between the locomotives is usually a "line of sight" distance. Such a measure may be sufficient when the locomotives are on relatively straight sections of the same or parallel track; but, where the track has a considerable curvature, the distance along the track between two locomotives may be somewhat different from the line of sight distance. Because the criticality distance between locomotives is usually the distance "along the track", a system which uses merely signal strength or geometric calculations may signal an alert when none is necessary; i.e., while the locomotives are within the threshold distance of each other along the line of sight, they are further apart as measured along the track.

Prior art location determination systems (LDS) disclose various methods for determining the location of vehicles on a railway system. Wayside units and local detectors are well known systems in the prior art and provide an accurate location of railway vehicles, but the detection systems are expensive to acquire, install, and maintain, particularly in harsh environments.

LDS systems using satellite based systems are also well known. The Global Positioning System (GPS) and other satellite based location determining systems have been available and in use for a number of years (the term GPS is used hereafter to denote any positioning system which uses satellites and has capabilities similar to those of the GPS system.) Use of GPS systems with a wide variety of vehicles, including trains, is known to the field. Also known to the field are the inherent limitations of GPS use.

An accurate GPS location determination requires a GPS receiver to receive signals from four different GPS satellites. A train or any other vehicle can easily receive signals from the four required satellites if the vehicle is located in an open area, free of signal obstructions. For this reason, ships at sea and airplanes in flight are well positioned to make full use of GPS to accurately determine their location. A train located in an open area can similarly receive signals from the required four satellites. However, trains are not always so conveniently located.

The very nature of train travel is such that trains will be found in locations where they cannot easily receive from four satellites. Trains travel next to tall, signal obstructing structures, both natural and man-made. Trains travel through canyons and other areas which interfere with signal reception. As such, trains are often in the situation, unique from some other forms of mass and freight transit, in which they can receive signals from fewer than the required four satellites, and frequently can receive signals from only two satellites.

Obviously, there are other methods for determining the location of a vehicle. Particularly with respect to rail-based transportation, it is possible for a vehicle to have access to a database of information pertaining to rail routes whose locations are fixed and known. Such a database may be used to provide a way of converting elapsed distance from a known point along a known route into a location in two or three dimensional coordinates.

Such a system is well suited to rail vehicles by virtue of the fact that these vehicles cannot stray from their fixed and known tracks. The advantages of such a system are limited by its logistics, however. In order to know the distance traveled from a fixed point, an odometer type of measurement must be taken. Such a measurement is generally taken by counting wheel rotations, which is fraught with inaccuracies: wheels slip on rails, potentially both during acceleration and braking; wheel diameter changes over time as wheels wear down and develop flat spots; any wheel rotation measurement and calculation method is inherently at least partly mechanical, thus subject to mechanical problems; all such measurements are based on correctly resetting a counter at a designated zero point from which such measurements are taken, which might not be easily performed; and independent of the ability to measure distance travelled, the entire system is subject to the accuracy of the initial database upon which the final location determination is based.

It is desirable to combine the best features of satellite based and elapsed distance based location determination methods. Such a system could approximate a rail vehicle's location based on a track database to within some range of error. This estimate could be used as the basis for a satellite based measurement which takes into account not only the estimated location of the rail vehicle, but also the relative location of nearby geosynchronous satellites. Such a system need not have access to the full four satellites normally required.

While the typical prior art location determination systems require three or more satellites to achieve the accuracy required to efficiently plan train movement, recent developments in technology have allowed accurate location determination system with fewer than three satellites. A further explanation of how to determine location with as few as two satellites is disclosed in the Zahm et al. U.S. patent application Ser. No. 08/733,963, filed Oct. 23, 1996, entitled "Application Of GPS To A Railroad Navigation System Using Two Satellites And A Stored Database", to which this application is a continuation-in-part application.

Most prior art location determination systems are unable to distinguish between parallel tracks situated close together. For example, a train may be directed to a siding for a planned "meet and pass" with another train. Because the siding is parallel and located adjacent to the main track, the typical location determination system can not determine whether the train is on the main track or the siding. If this location position was then entered into a proximity warning system, the proximity system may indicate a collision situation between two trains, when in actuality the trains are correctly positioned for a meet and pass.

Because the typical proximity detection systems determine the location of each vehicle, it is possible to calculate the "line of sight" distance between the vehicles. This distance combined with the speed and direction of each vehicle enables the proximity detection systems to determine which vehicles pose a collision threat to each other. However, the collision threat determination of the typical prior art system may not always be accurate. For example, the determination of the actual location of two trains will permit the "line of sight" distance between the two trains to be determined. However, because the trains are constrained to operate on railway tracks, and the railway tracks may not run in a straight line between the two trains, the actual track distance between the two trains may differ significantly from the "line of sight" distance. Similarly, some prior art proximity detection systems do not take into account that the vehicles may be travelling on separate non intersecting tracks so that although the vehicles appear to be travelling towards each other, there is no opportunity for a collision because they are on separate tracks.

Regardless of the type of LDS system used, the location of the vehicles on the railway system is necessary component in the typical proximity detection system. The more accurate the location determination, the more closely that vehicles can be positioned together because the margin of error is reduced without having to account for the uncertainties of vehicle locations.

Accordingly, it is an object of the present invention to provide a novel of method and system for controlling railway vehicles which obviates these and other known difficulties in collision avoiding and location determining systems for railways.

It is a further object of the present invention to provide a novel of method and system for controlling railway vehicles which increases the throughput of vehicles on a railway system while minimizing collisions between the vehicles.

It is another object of the present invention to provide a novel method and system for controlling railway vehicles which determines the track distance between vehicles on a railway system.

It is yet another object of the present invention to provide a novel method and system for controlling railway vehicles by automatically disabling the alarming and the enforcement function of a proximity detection system based upon the location or the speed of the vehicle.

It is still another object of the present invention to provide a novel method and system for controlling railway vehicles by manually disabling the enforcement function of a proximity detection device without disarming the warning feature.

It is a further object of the present invention to provide a novel method and system for controlling railway vehicles by reducing the number of expected alarms received from the proximity detection system.

It is yet a further object of the present invention to provide a novel method and system for controlling railway vehicles by differentiating railway vehicle locations between closely positioned track paths.

It is still a further object of the present invention to provide a novel method and system for controlling railway vehicles by improving the accuracy of their location determination systems.

It is yet another object of the present invention to provide a novel method and system for determining and displaying railway vehicle information consistent with railway operating practices.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 3 is a simplified pictorial representation of a PDD display unit which can be used in the system of FIG. 1.

DESCRIPTION OF PREFERRED EMBODIMENTS

Figure 1:
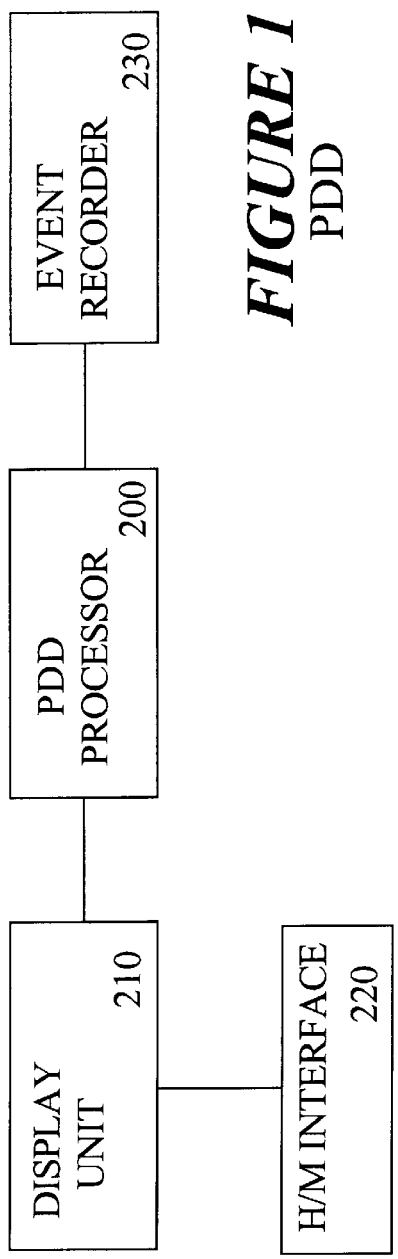
FIG. 1 is a simplified block diagram of the major components of the Proximity Detection Device (PDD) system and method of the present invention.

With reference to FIG. 1, the components of the proximity detection device (PDD) may all be located on a single vehicle and may include a PDD processor 200, a display unit 210, an event recorder 230, and a human/machine interface 220 which can be used to receive inputs from a person controlling the vehicle.

In operation, the PDD processor 200 receives and compares the location data from vehicles on the railway system and compares it to the location data for the vehicle on which it is installed (platform vehicle). The PDD processor 200 can provide the vehicle information to the display unit 210 so that the vehicle operator is aware of vehicles of concern. The PDD processor 200 analyzes the vehicle information and generates a warning which activates an alarm on the display unit 210 if a collision threat exists. The alarm may be aural as well as visual. The human/machine interface (HMI) 220 allows the operator to acknowledge alarms and control the operation of the proximity detection system. Such control commands may include a remote acknowledgment and disabling all or a portion of the PDD. The event recorder 230 may be connected to the PDD processor 200 which may record all information and alarms as well as subsequent enforcement actions taken by the proximity detection system or taken by other PDD equipped vehicles. The event recorder may be a conventional event recorder which is well known in the railway arts.

Figure 2:
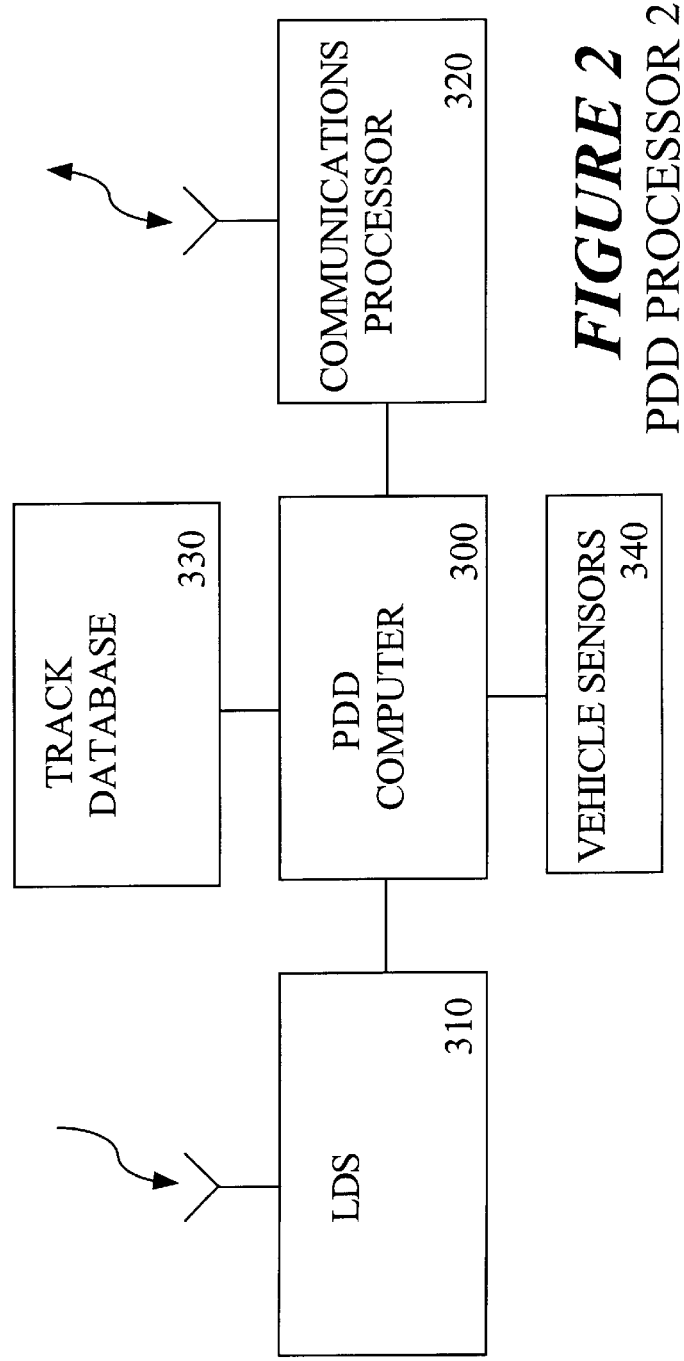
FIG. 2 is a simplified block diagram of a PDD processor which can be used in the system of FIG. 1.

With reference to FIG. 2, the PDD processor 200 may include a PDD computer 300, a location determination system (LDS) 310, a communication processor 320 and a track database 330. The track database 330 contains specific information for the railway system serviced by the PDD system and may include one or more of: the location of all possible railway track paths, milepost markers, switches, curve data, grade profile, railyard boundaries, signal locations and speed restrictions. Vehicle sensors 340 provide the PDD computer 300 with the necessary information to determine vehicle speed and direction of travel. The communications processor 320 may include a communications transmitter, receiver and/or transceiver.

In operation, the LDS 310 determines the geographic location of the vehicle, such as the longitude and latitude of the vehicle, and sends this information to the PDD computer 300. If needed, the PDD computer 300 converts the geographic location from the LDS 310 to a specific mile post number of the railway system based on information retrieved from the track database 330. For additional accuracy, cross-checking and safety, the PDD computer 300 may also receive inputs of the vehicle's direction of travel and velocity from vehicle sensors 340.

With continued reference to FIG. 2, the communications processor 320 through a wireless link may receive signals indicating the location of other, similarly equipped vehicles, and may provide such vehicles with signals indicating the location of the vehicle on which it is installed. The information transmitted (and received from other vehicles) by the communications processor 320 may include the vehicle's identification number, its location (geographic or by mile post), its direction of travel and its speed. The communication processor 320 may transmit vehicle information as a digital RF signal. In order to reduce the bandwidth required to transmit vehicle location, the communication processor 320 may transmit vehicle location as a milepost location rather than a latitude and longitude position because the milepost location may require fewer digits of information. The transmission of milepost information may also require less processing by the receiving PDD in order to compute distances.

After receiving the location of other vehicles from the communications processor 320, the PDD computer 300 may then access the track database 330 to determine which vehicles pose a collision threat. The PDD computer 300 will initiate a proximity alarm if the track distance to any vehicle identified as a collision threat is less than the predetermined threshold distance. By accessing the track database 330, the PDD computer 300 is able to determine the track distance (as opposed to the line of sight distance) between the PDD platform vehicle and all other vehicles. If the operator does not acknowledge the proximity alarm through the HMI 220, the PDD computer 300 may issue a penalty brake command to the brake control system to stop the platform vehicle. Upon enforcement application of the braking system by the PDD computer on an equipped vehicle, the communications processor 320 may immediately broadcast a message to other equipped vehicles in the railway system. A message indicating that enforcement braking has taken place on another vehicle in the proximity of a train may be displayed on the display unit 210 and may be accompanied by an aural alarm.

When an alarm is sounded and cleared by the operator, the PDD may use hysteresis to avoid unnecessarily sounding the alarm again for a trains that have remained relatively fixed in position with respect to each other. Thus, for following trains which are approximately the alarm distance apart from each other, the alarm will not be restarted merely because the distance between the trains fluctuates around the alarm trip point. The hysteresis can be implemented either on the basis of distance between the trains or the time that the trains have spent at approximately the same distance.

In an alternative embodiment, the alarm can be triggered not strictly on the basis of distance but also on the basis of speed and/or expected train braking distance. While such an embodiment may require the transmission of additional data between trains, the proximity warning system in this embodiment may avoid unnecessary warnings. For example, a train following along the same track at a relatively slow speed may not be considered as much of a collision danger as a train travelling at a higher speed. The PDD may set different alarm points for the trains depending upon their speed, the track conditions (wet or dry, etc.), the grade of the track, and/or the expected braking distance for the particular train.

In a preferred embodiment, the PDD computer 300 may also control the mode of the PDD based upon a preestablished set of guidelines. For example, when a train enters a railyard or other area of known traffic congestion, the continuous sounding of proximity alarms and the potential enforcement braking application may be distracting and detrimental to the safe operation of the train, yet it may be desirous to continue to display vehicle location information. The geographic limits of the railyards and other high traffic areas may be entered into track database 330. Accordingly, if the PDD computer 300 determines that the vehicle has entered the boundaries of a railyard, the PDD computer 300 may automatically disable the automatic alarm and enforcement braking features of the proximity detecting device while maintaining the broadcasting, receiving and displaying of information. When the PDD computer 300 determines that the vehicle has left the boundaries of the railyard, the PDD computer 300 may enable the automatic enforcement braking feature. Similarly, PDD computer 300 may disable the automatic enforcement braking feature when it senses that the vehicle's speed is less than some predetermined threshold. Accordingly, at slow speeds, where automatic enforcement action may not be as crucial, the PDD computer 300 may prevent the disruptive effect of an unintended braking application.

The presence of multiple PDD equipped vehicles in close proximity such as a railyard may also result in a degradation of the communications environment due to transmission congestion. In a preferred embodiment, if the PDD computer 300 may reduce the rate at which transmissions of vehicle data are transmitted by communications processor 320. For example, if PDD computer determines it has entered the boundaries of a railyard as described above, the PDD computer 300 may direct the communication processor 320 to transmit platform vehicle information once per minute rather than the transmission rate outside the railyard boundary of once per three seconds.

In a preferred embodiment of the present invention, the vehicle operator may manually control the operation of the PDD through the HMI 220. For example, a PDD locomotive may be used in conjunction with other PDD equipped locomotives in a single consist in a distributed power arrangement. The operator may command the PDD for each trailing locomotive to a passive mode. When the PDD is in a passive mode, the communications processor 320 may still receive transmissions and display unit 210 may still display received information but the communications processor 320 may not transmit platform vehicle information and the PDD computer may disable the proximity warning and enforcement features.

Similarly, the operator may use the HMI 220 to specify to the PDD that the locomotive is currently on a siding (or conversely on the main track). The PDD can use this information to determine whether to raise an alarm and the urgency of such an alarm. For example, a train wholly within a siding, may be considered not to be a collision threat to trains on the main line. The PDD can operate to automatically change a siding designation to the main line when, for example, the location determination system determines that the train has travelled past the end of the siding. Under these circumstances, the PDD can automatically change the "siding" designation to show that the train has re-entered the main line.

FIG. 3 represents a specific embodiment of the PDD display unit 210. The display unit 210 may have the capability to display the following information:
ID—unique vehicle identification number
MP—mile post location of the vehicle
TRAK—M/T (Main), SDG (siding), yard identification number, LOST (GPS failure) or OUT (out of PDD range)
DIST—track distance from active vehicle
D—direction of other vehicle from platform PDD
T—direction of travel of vehicle
SP—speed of vehicle
STATUS—NORMAL, ALARM, NAP, or BRAKES
AGE—age of information displayed The presentation of the information on display unit 210 may generally be consistent with standard railway operating practices. For example, the direction of travel of each vehicle (N, S, E or W) is derived from the ascending or descending mileage as determined from the track database 330, as opposed to a direction of travel determined from point to point GPS fixes. This direction of travel corresponds with the direction of travel as listed in standard railway timetables. Accordingly, if a vehicle is travelling along a railway path that is defined as South in the railway timetable, the display unit will display a "S" for direction of travel, even if the vehicle is temporarily heading or moving to the north due to the changing direction of the track (i.e., switchbacks). Similarly, the location of the vehicles may be displayed by milepost which may be more familiar to the vehicle operator rather than a latitude and longitude position.

With continued reference to FIG. 3, line item displays 400 represent the information for the four closest vehicles to the platform vehicle. Line item display 405 represents the platform vehicle information. Display unit 210 may provide the vehicle operator with the sufficient information to identify each vehicle that may pose a collision threat as well as provide sufficient prompting to avoid a potential collision. For example, the information represented on display lines 400 have associated with it a column representing the age of the data being displayed. If for some reason communications is lost with any of the vehicles being displayed, the age of the data displayed for that vehicle will indicate that the information displayed may no longer be current. Additionally, the display may also be able to indicate when a vehicle, either the platform or other displayed vehicle, has left the area where the PDD coverage is operable.

The specific implementation of the PDD data unit shown in FIG. 3 is illustrative only and not intended to be limiting. Those skilled in the art will understand that other specific embodiments of the data unit may be implemented within the teachings of the present application and the scope of the present invention.

Figure 4:
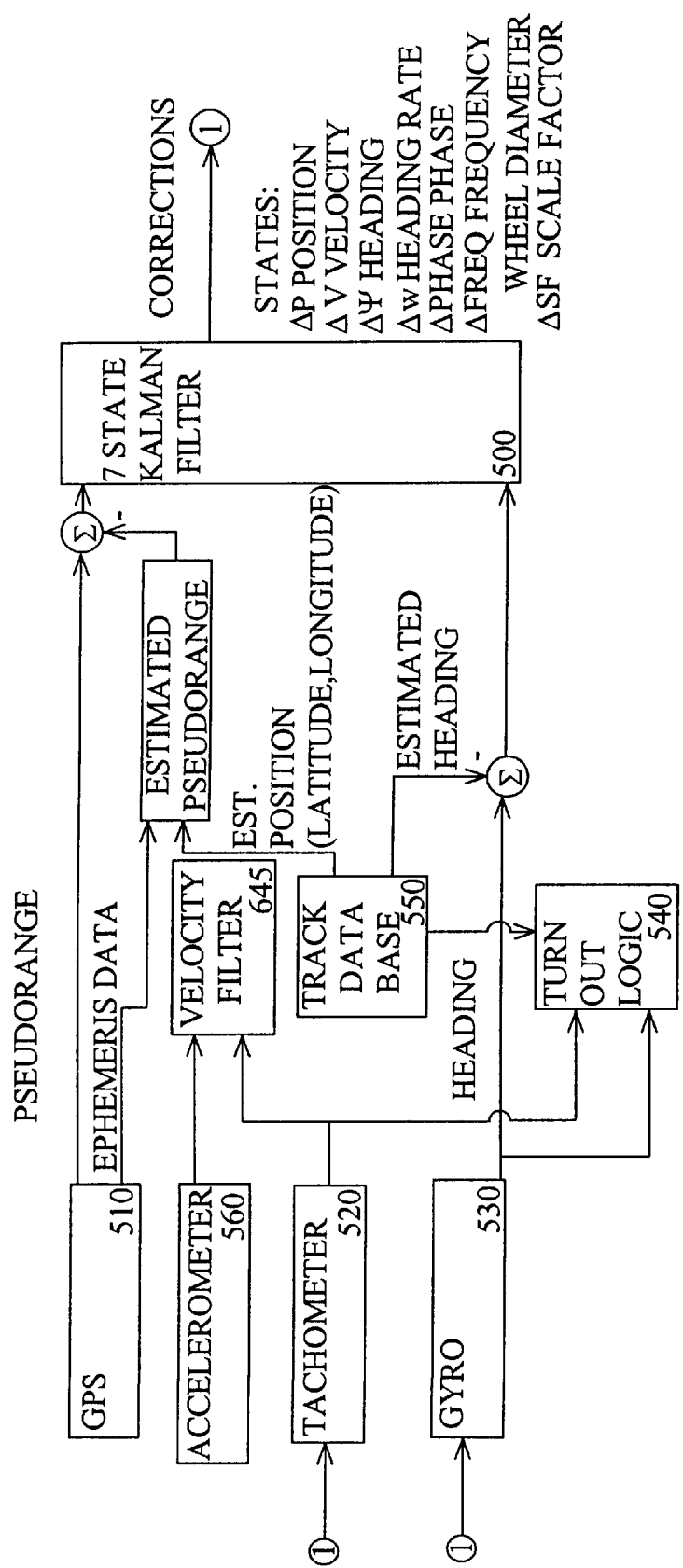
FIG. 4 is a simplified block diagram of the LDS which can be used in the processor of FIG. 2.

With reference to FIG. 4, one specific embodiment of the location determination system (LDS) provides for a solution of heading, speed and vehicle position that arises from optimally fusing the outputs of four different sensors in a Kalman filter 500, coupled with track correlation data from a track database 550. The four sensors may include a GPS 510, tachometer 520, gyro 530 and accelerometer 560. The LDS may also use a turn out processor 540 to identify which of several possible track paths the vehicle may be travelling. By blending the above sensors together with the track database 550, the turn out processor 540 is able to determine which of several candidate tracks it can be located on by using very accurate gyro inputs into the Kalman filter 500 to ascertain when a switch is taken.

The track database 550 may include data representing the identification of the track (as used by the railway, including timetable direction), the location of the track segments (latitude and longitude), the curvature of the track segments (including switches), the grade of the track, control points and switch locations. The heading and/or elevation of the track at various locations can be computed from the curvature and/or grade data points or (for ease of computation) may be stored.

In operation, the Kalman filter 500 may be a seven state extended Kalman filter that processes up to ten measurements. The measurements may consist of the pseudorange errors from up to 8 GPS satellites obtained by subtracting the GPS provided pseudorange from the calculated pseudorange based on satellite location and location derived from the track database 550, heading errors obtained from subtracting the heading obtained from the track database 550 from the heading obtained from the gyro 530, and a position error which is generated when the train takes a switch or a well defined turn, by subtracting the estimated location of the turn as derived from the tachometer 520 from the location of the turn obtained from the track database 550. The output of the Kalman Filter 500 consists of the following error estimates: position error along track, velocity error along track, heading error, gyro bias correction, tachometer scale factor error, GPS receiver clock error and GPS receiver clock frequency error. These error estimates are then fed back to the various sensors to make the appropriate corrections.

With continuing reference to FIG. 4, the LDS may use a specific method of track matching to determine which of several possible track paths a vehicle is travelling. For example, LDS uses GPS 510 to provide an approximate location of the vehicle. The track database 550 may then provide all track paths within a specified region of uncertainty for the approximate position of GPS 510. The specified region of uncertainty is a function of the Horizontal Dissolution of Precision (HDOP) of the GPS point solution. A separate Kalman filter is established for each possible track path contained within the region of uncertainty. As the vehicle travels down the track, each Kalman filter monitors the residuals in heading state. For each Kalman filter, as the residual difference between the heading from the track database 550 and from the gyro 530 exceed a predetermined threshold, that possible track path is eliminated. When all possible track paths are eliminated but one, the LDS declares that it has determined which track the vehicle is located and where on that track the vehicle is positioned. As the vehicle continues down the track, the Kalman filter 500 continues to identify the current region of uncertainty. When switches, identified in the track database 550, move into the current region of uncertainty, separate Kalman filters are established, one for each path. The turn out processor 540 retrieves from the track database the expected turn rate for each track path. The turn out processor 540 compares the turn rate from the gyro 530 with the expected turn rates from the track database 550 and compares the heading derived from the gyro 530 with the expected heading from the track database 550 to verify which track path the vehicle has taken. Once the turn out processor 540 has determined which track path the vehicle has taken, the filter for the other path is eliminated.

This method of track matching enables the LDS to distinguish between multiple track paths similarly situated in close proximity. For example, in a meet and pass situation, one train may be directed on to a siding (which is parallel and adjacent to the main track) to allow another train to pass on the main track. Without a method to differentiate between the train locations on these two paths, the proximity detection system would initiate an unnecessary proximity alarm.

Figure 5:
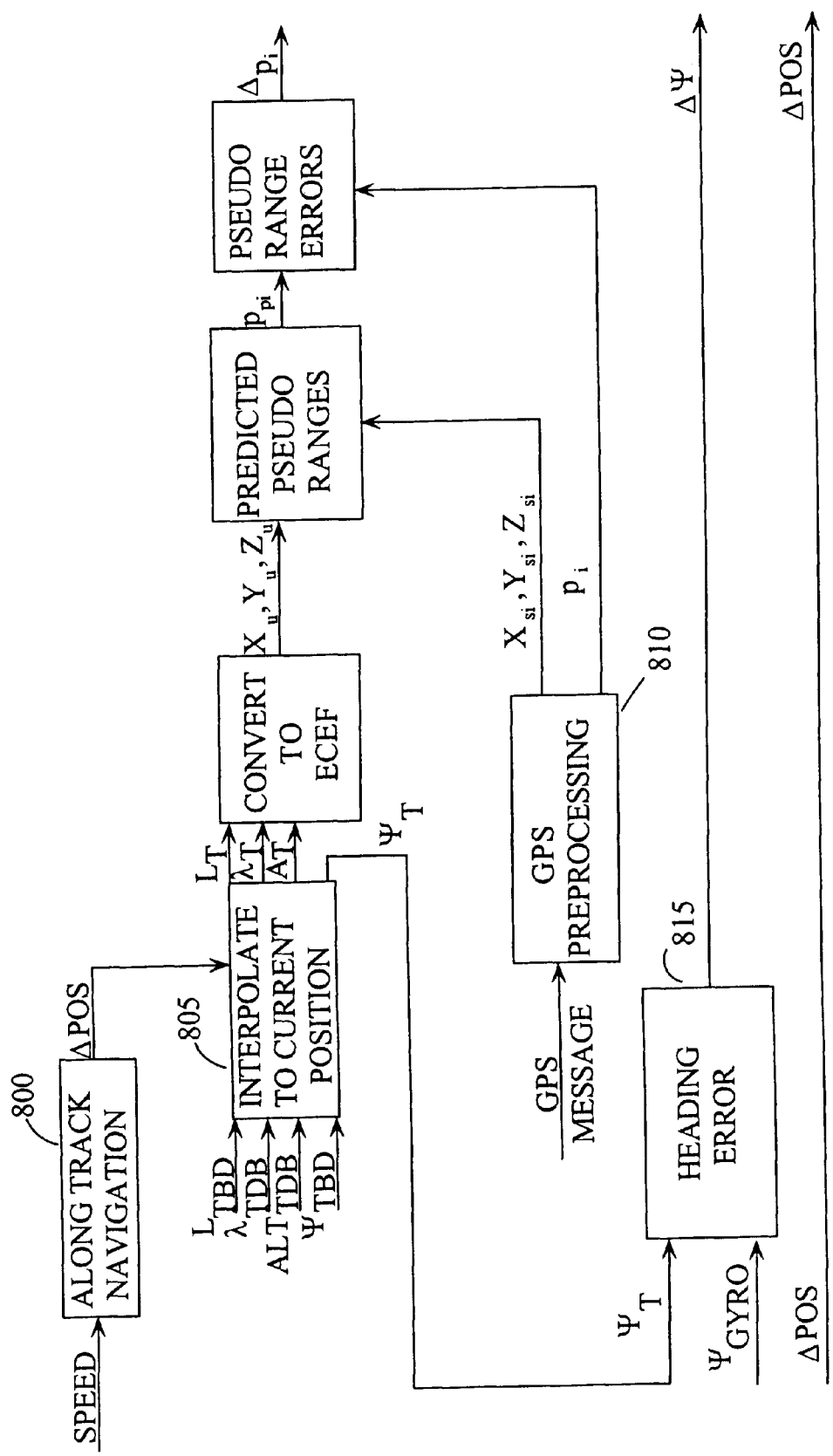
FIG. 5 is a simplified block diagram of the data and signal flow through the LDS of FIG. 4.

With reference to FIG. 5, the flow of data and signals through an LDS in accordance with one embodiment of the present invention may be illustrated by the simplified functional block diagram of FIG. 5. With reference to FIG. 5, the speed of the vehicle acts on the on board sensors within the Along Track Navigation function 800 to produce a change in position over a given time period. The change in position (along the track) during the time period can be applied to logic circuits 805 which update the last estimate of position along the track (latitude, longitude, heading, altitude) and the track database to determine an update position estimate (latitude, longitude and altitude) and an updated heading estimate. The position estimate may be converted to a three-axis, earth-centered estimate (X, Y, Z coordinates) and compared to an estimate of the position concurrently received from a GPS system 810. The two position estimates may be compared to develop pseudorange errors which are input to the Kalman filter.

Similarly, the heading estimate received from the track data base may be compared by a Heading Error process 815 to the heading obtained from the gyro. This heading error can likewise be provided as an input to the Kalman filter. Finally, the change in position (along the track) as determined by the tachometer and associated logic circuits may be provided to the Kalman filter.

Figure 6:
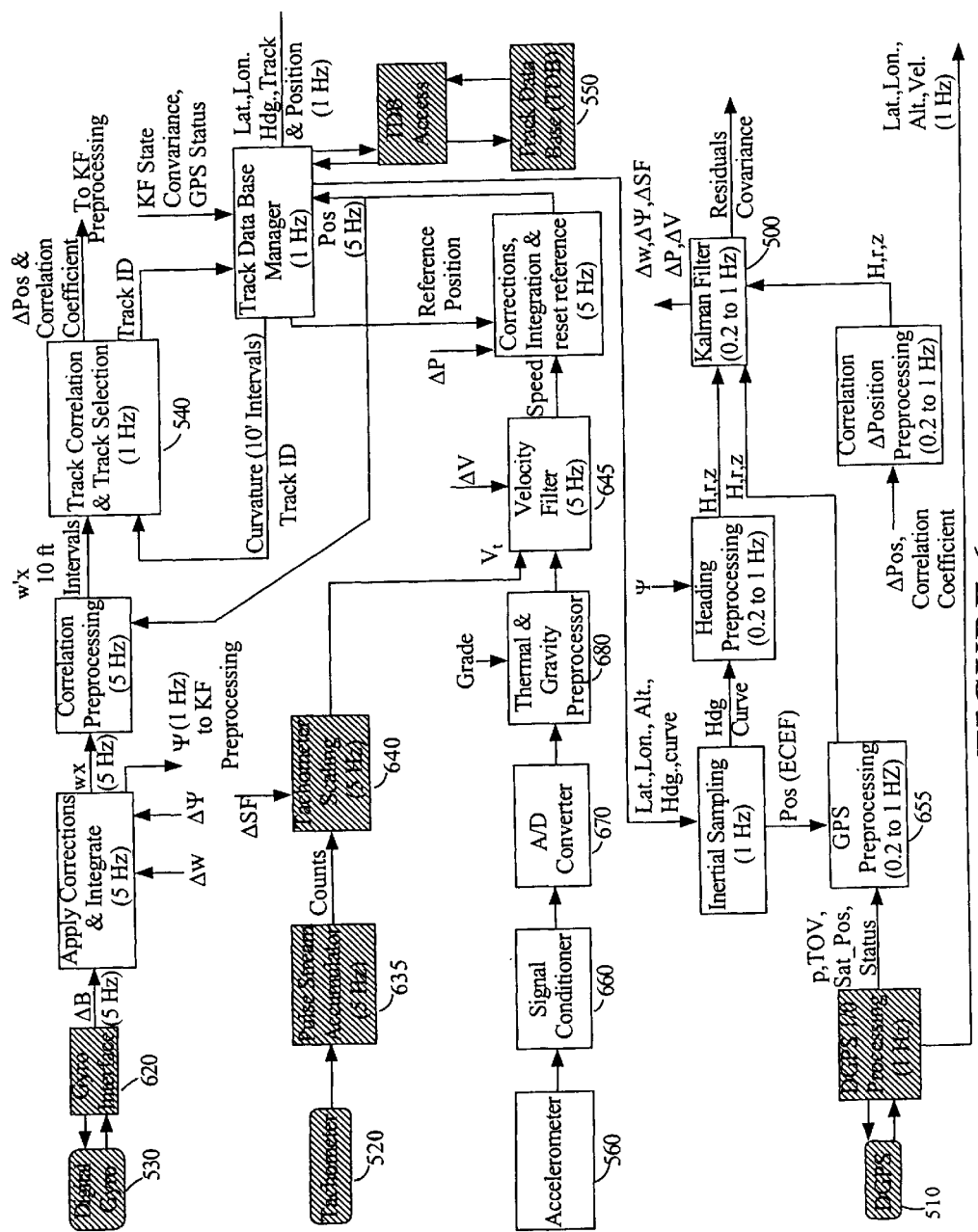
FIG. 6 is a simplified block diagram of an implementation of the LDS of FIG. 4.

A specific implementation of the LDS 310 in accordance with the present invention is illustrated in FIG. 6 in which similar elements to those in the system of FIG. 4 bear the same reference numeral. A gyro 530, such as a digital gyro, along with a gyro interface 620 may be fixedly mounted to a vehicle and provide signals indicating a rate of turn being experienced by the gyro (and the vehicle). The rate signals may be adjusted by a current gyro bias and rate error and integrated over time to provide an estimate of the current heading. The results of the heading determination may be correlated by a track correlator which compares the heading obtained from the gyro 530 to a heading expected from the curvature of the track (as obtained from the track database 550). The output of the track correlator 630 may include an estimate of the position error and a correlation coefficient which can be provided to the Kalman filter 500 and an identification (or confirmation) of the track over which the vehicle is running.

Simultaneously with the operation of the gyro 530, the LDS may use the wheel tachometer 520 to provide an estimate of the velocity of the vehicle. The output from the tachometer 520 may be accumulated by a pulse stream accumulator 635 and provided to a tachometer scaler 640 which computes the velocity from the tachometer counts, taking into account the bias provided by any changes in wheel diameter. The determined velocity may be provided to a velocity filter 645 which adjusts for the current estimate of the velocity error along the track. An accelerator 560 fixed to the vehicle may provide an output to a signal conditioner 660 which is then converted to a digital signal by an analog/digital converter 670. The digital acceleration signal is provided to the thermal and gravity preprocessor 680 to correct for the temperature and for the grade of the track the vehicle is traveling. This corrected acceleration signal is input to the velocity filter 645 to determine velocity bias due wheel slip. The filtered velocity measurement may be provided to an integrator 648 which determines the position of the vehicle along the track, adjusting for the current position error estimate. The measured position of the vehicle along the track can be used by the track data base manager and the track correlator 630 to coordinate the measured position and heading information.

With continued reference to FIG. 6, the LDS may also include a satellite based position determining system, such as a GPS system 510. If desired for improved accuracy, the position determining system may be a Differential GPS system, as in known in the art. Depending upon the number of satellites visible at any one time to the DGPS 510, the DGPS provides a measurement of the pseudorange from the DGPS receiver (on the vehicle) to the satellites. The pseudoranges and the ephemeris of the positions of the satellites may be used by a GPS processor 655 to provide an estimate of the vehicle's location (in latitude, longitude, altitude and velocity). In addition, the DGPS estimate of the position of the vehicle may be compared to the estimate of the position obtained from the track database 550 to provide pseudorange error estimates of the Kalman filter 500.

As noted above, the Kalman filter 500 may provide updated error estimates of each of the measuring sensors which may then be applied to future estimates from each of the sensors. As will be recognized by those skilled in the art, the use of the track database 550 which may precisely locate the vehicle at various points (such as turnouts, etc.) along its movement in conjunction with a Kalman filter provides a continuous estimate of vehicle position which is highly accurate and remains so over the entirety of the trip by the vehicle. Because the system of the present invention obtains such positional accuracy without the use of conventional trackside position indicating equipment, the system represents a location system which is both highly accurate and readily maintained by railway managers.

Figure 7:
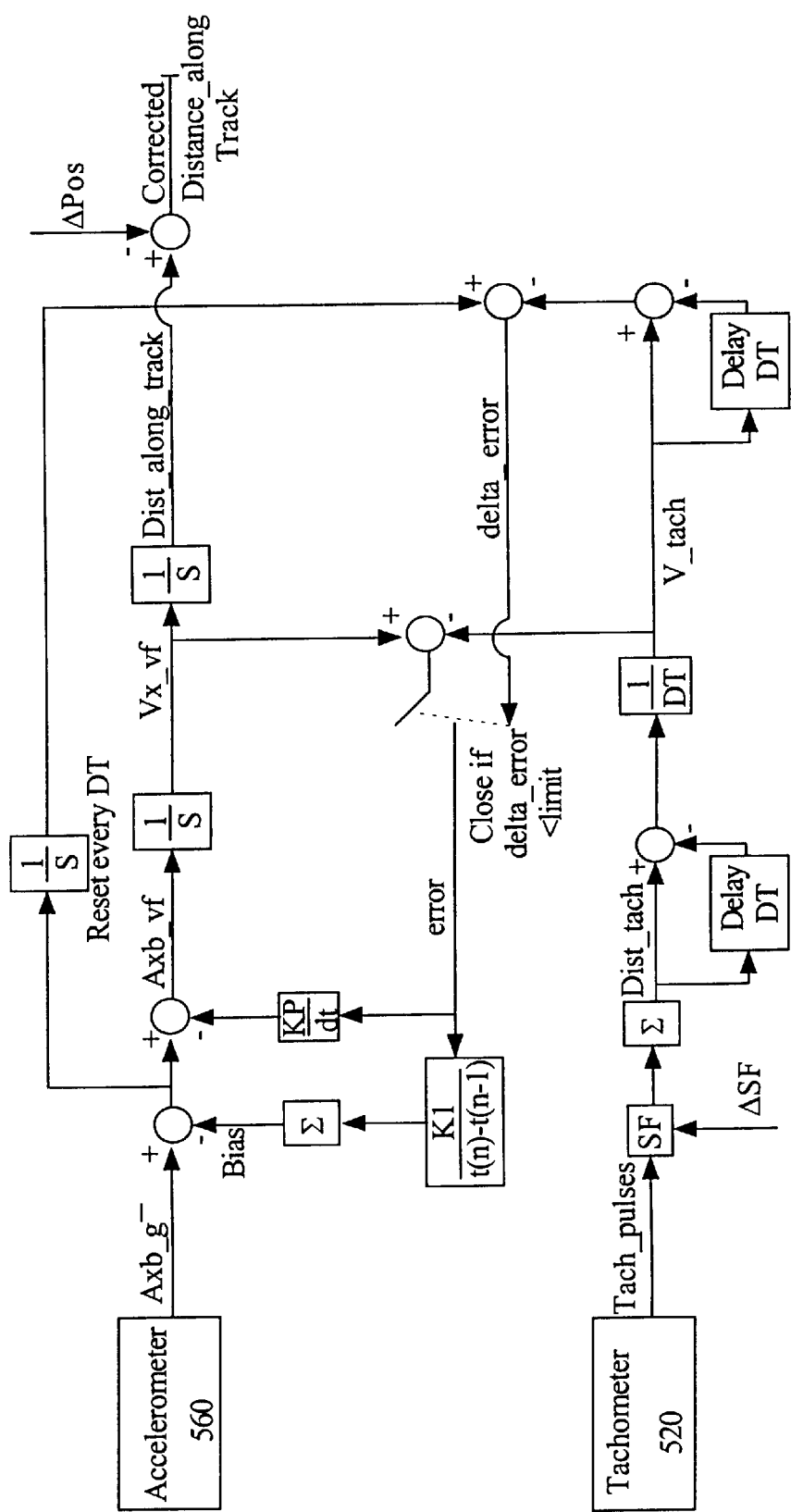
FIG. 7 is a simplified block diagram of an implementation of the velocity filter of FIG. 6.

A specific implementation of the velocity filter which may be used in a system in accordance with the present invention is illustrated in the simplified block diagram of FIG. 7. In this illustrated filter, the accelerometer 560 is used in conjunction with the tachometer 520 of the system of FIG. 6 to provide filtering to remove the effects of wheel slip. The output of the accelerometer 560 is integrated to determine the velocity and the distance along the track. The change is velocity as determined from the output of the accelerometer is compared to the change in velocity as measured by the tachometer 520 for some set interval. If the change in velocity as determined from the output of the accelerometer 560 and the change in velocity as determined from the output of the tachometer 520 agree to within a predetermined threshold level, it may be assumed that no significant wheel slip is present and a correction to accelerometer bias and to the integrated velocity along track is applied based on the current tachometer velocity.

Figure 8:
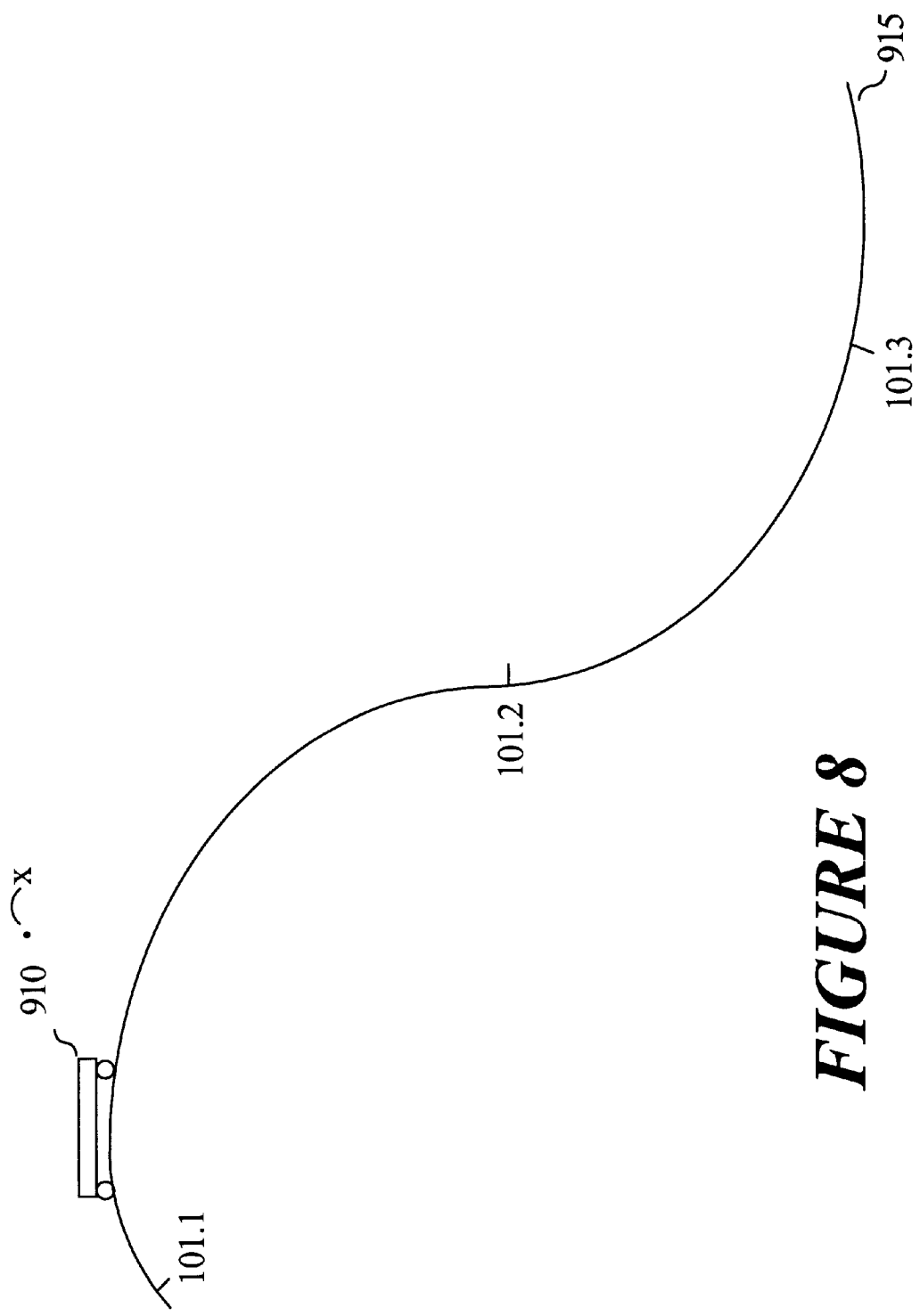
FIG. 8 is a simplified pictorial representation of a track layout which can be used in the system of FIG. 1.

Depending upon a railway's specific requirements for safety, freedom from unnecessary warnings, track layout, etc., a PDD in accordance with the present invention may not need to use a LDS which provides the location accuracy provided by the LDS described above. Accordingly, alternative embodiments of an LDS may readily be used in a PDD system in accordance with the present invention. With reference now to FIG. 8, in present day railway track layouts, the track is marked by wayside markers (often on posts) which indicate the mileage along the track from predetermined initial points. Train crew personnel use these mile markers to orient themselves as to their location and to identify their location to others during radio communications. Often, the mileage markers are not precisely placed exactly one mile apart, often being either more or less than a mile, depending upon local conditions. In establishing a track database which correlates mileage markers to geographic position, such as may be used in an LDS, recognition should be made of the facts that the mileage markers are not always exactly one mile apart and that the system determining the geographic position (such as a satellite navigation system) will have certain errors or uncertainties in identifying the location of the train. For example, a train 910 travelling along a track 915 may compute that its position is at a point X not on the track. Because the accuracy of the location determining equipment may not be able to determine the location of the train sufficiently precisely, it can be expected that the point X will usually not align perfectly with the track location as stored in the track database.

To determine the track mileage to display and to transmit to other trains, the system of the present invention could calculate the distance to the nearby track mileage points stored in the track data base and select the mileage point nearest to the satellite-determined position. Such a method would involve considerable mathematical processing to calculate the candidate distances, particularly when the variable distance between lines of latitude are taken into effect. In another embodiment of the system of the present invention, such processing is largely avoided by the use of areas boxes associated with each mileage point.

Figure 9:
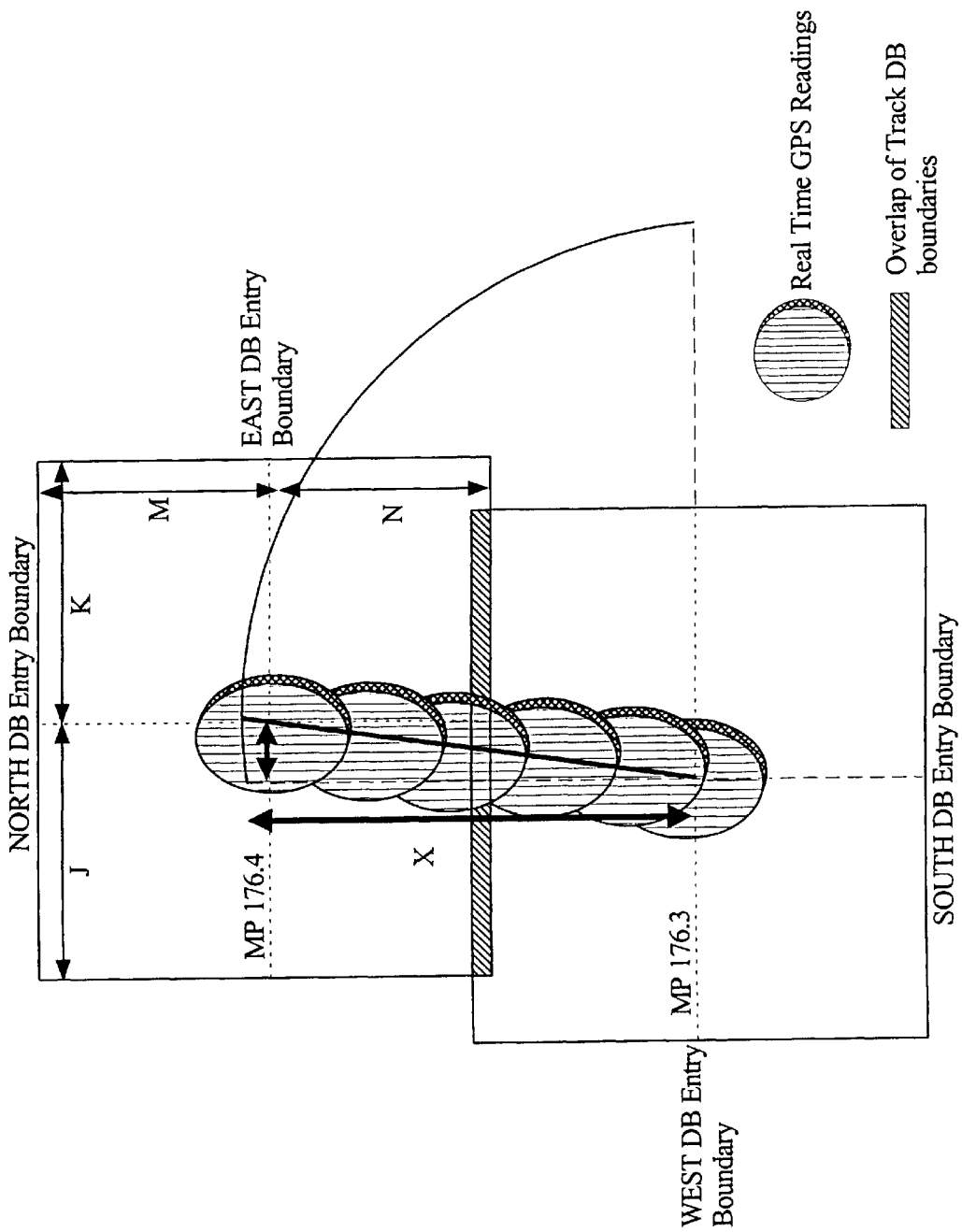
FIG. 9 is a simplified pictorial representation of a track boundary box which can be used in the LDS of FIG. 2.

With reference now to FIG. 9, a track can be represented by a set of points (for example, a latitude and longitude), one set at each of the mileposts of the track. For finer granularity, the database can store data points for smaller increments of distance along the track (0.1 miles, for example). In one embodiment of the present invention, the mileage points are not stored but rather the system uses a series of boxes, the size of which are defined around the mileage points based on the track layout and the expected uncertainty of the measurement of location. A location measurement which falls within a defined box is considered to be associated with the mileage point associated with that box (usually mileage point at the center of the box). If the definitions of the box boundary points are stored tabularly, the progress of a train from one mileage point to another mileage point can be determined by a simple comparison of the measured location to the boundaries, avoiding the considerable computations needed for a direct comparison of computed distances from the locations of the mileage points. Note that in this embodiment of the present invention, that the boxes defined by the boundaries can have different sizes depending upon the track layout. For example, the boxes associated with railyards can be relatively large (as large as the railyard) because of the PDD's ability to reduce the alarm sounding and position transmission within such yards.

If the location as measured by whatever measuring system is being utilized falls outside the boundary boxes stored in the track database, a signal can be sent to the train personnel alerting them that they have left the geographic area covered by the PDD. Of course, such a signal should not be sent until sufficient filtering has been done to ensure that the measured location is stable and not merely a transient anomaly.

Figure 10:
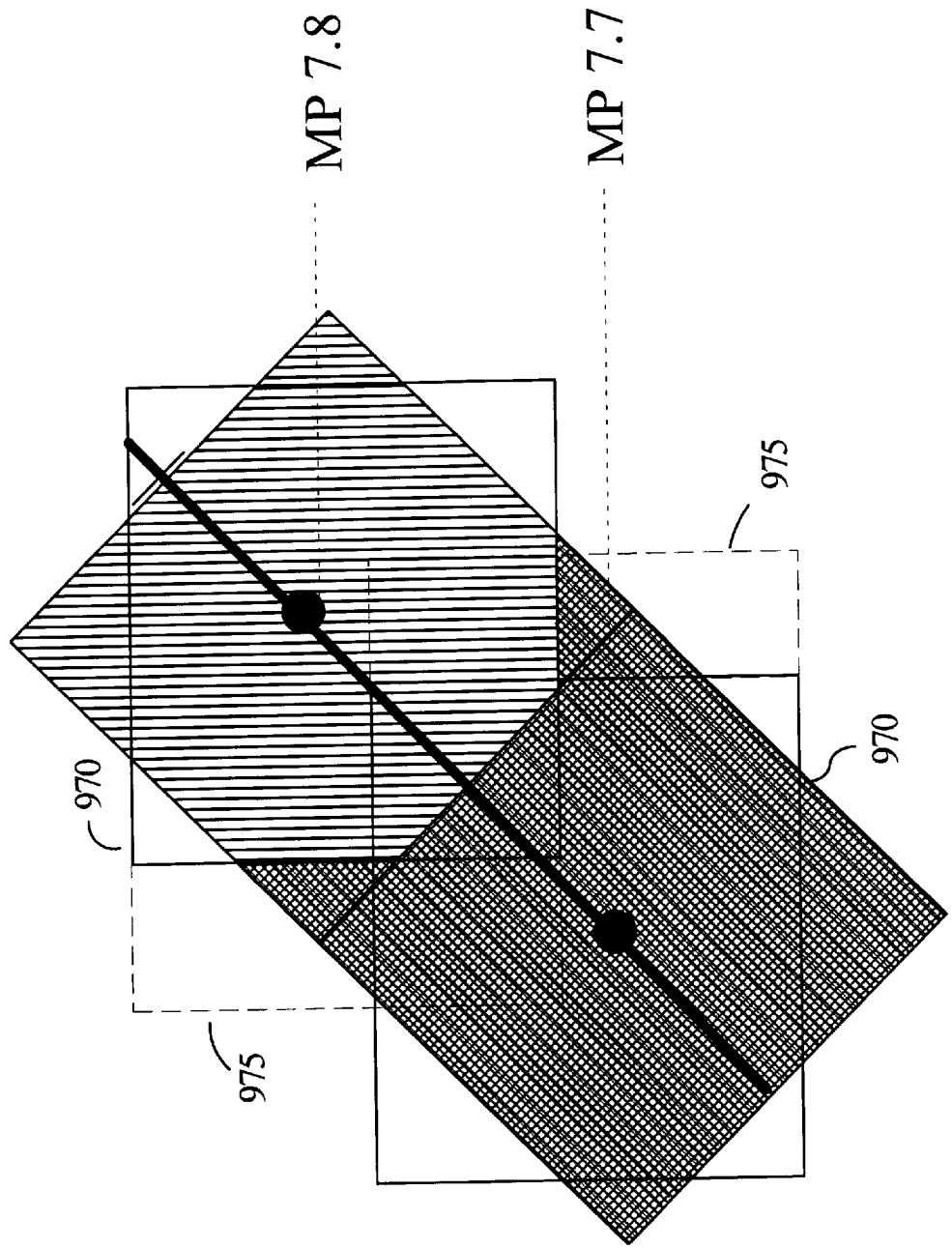
FIG. 10 is a simplified pictorial representation of a track boundary box which can be used in the LDS of FIG. 2.

Variable size boxes can also be used to account for the angle of the movement of the vehicle with respect to the grid used by the location measurement system. For example, and with reference to FIG. 10, if the vehicle is moving at an angle of approximately 45 degrees to the grid of the boxes, the system of the present invention may have a tendency to have a reduced tolerance for uncertainty at locations midway between adjacent boxes. In this situation, the size of the boundary boxes can be increased, which increases the overlap between the adjacent boxes but also provides a system in which uncertainty in the measured location in a direction perpendicular to the direction of travel remains at or above a predetermined minimum. For example, and with continued reference to FIG. 10, if a standard box used in a location determining system is of the size shown by the smaller boxes 970, the box size can be increased in the appropriate sections of the route to the size shown by boxes 975.

Note also that the relatively simple location determining system of this embodiment is not limited to use on trains but may also be readily used by any vehicle which is supposed to be running a predetermined route, such as a bus, and alerting signals when the vehicle leaves the PDD area can be sent not only to the vehicle operator but also to supervisory or control personnel.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An on-board vehicle proximity detector comprising:
    (a) means for determining the geographic position of a vehicle carrying the proximity detector, said vehicle traveling along a predetermined track layout;
    (b) a database of track parameters of the track layout on which the vehicle is traveling;
    (c) means responsive to said database and said geographic position determining means for determining the track position of the vehicle;
    (d) means for receiving from other vehicles wireless signals including the track positions of the other vehicles;
    (e) means responsive to said track position determining means and said receiving means for determining the distance along said track layout between the vehicle carrying the proximity detector and each of the other vehicles from which track positions are received; and, (f) means responsive to said distance along the track determining means for initiating an alarm if the determined distance is less than a safe amount.

2. The proximity detector of claim 1 including means for transmitting the track position of the vehicle carrying the proximity detector via a wireless link.

3. The proximity detector of claim 1 further comprising:

(g) means for automatically initiating a braking action if a crew of the vehicle fails to respond appropriately to the alarm.

4. The proximity detector of claim 1 further comprising:

(h) means for automatically disabling said means for automatically initiating a braking action at predetermined locations along said track layout.

5. The proximity detector of claim 1 further comprising:

(i) means for automatically disabling said means for automatically initiating a braking action whenever the speed of the vehicle is below a threshold level.

6. The proximity detector of claim 2 wherein the transmission of the track position is performed periodically at plural periodic rates, one of said periodic rates being used when the vehicle is at some portions of the track layout and others of the periodic rates being used when the vehicle is at other portions of the track layout.

7. The proximity detector of claim 1 wherein said database includes a table of successive geographic boxes, each of said boxes being associated with a different position along said track layout.

8. The proximity detector of claim 7 wherein some of said geographic boxes represent geographic areas having a first size and others of said geographic boxes represent geographic areas having a second size, said first size being different from said second size.

9. The proximity detector of claim 7 wherein each of said boxes is defined by a line of longitude and a line of latitude.

10. The proximity detector of claim 7 wherein the size of some of said geographic boxes is determined, at least in part, from the area of uncertainty associated with said geographic position.

11. A method for determining the location of a railway vehicle along a track in a track layout having plural parallel tracks for at least a portion thereof and having switches between some of said parallel tracks, said railway vehicle comprising a satellite positioning system, a gyro, a linear position estimating device and a track database, comprising the steps of:

(a) providing an approximate location of the vehicle from the satellite positioning system;

(b) determining from the track database all track paths within a specified area of uncertainty from said approximate location;

(c) establishing a Kalman filter for each determined track path, each of said filters monitoring the difference between the vehicle's heading as measured by said gyro and heading data stored in the track database;

(d) monitoring at each Kalman filter as the vehicle moves along the track for residual differences in the heading state;

(e) upon a residual difference exceeding a specified threshold value, eliminating the associated track path as one of the track paths; and, (f) upon the reduction of the number of track paths to one, declaring the associate path to be the path along which the vehicle is travelling.

12. A proximity detection system for a vehicle having an identification associated therewith and travelling along a predetermined track layout comprising:

(a) a satellite positioning system which provides signals indicating the geographic location of the railway vehicle;

(b) a track database which includes data regarding the track used by the railway vehicle, said track including plural track segments, and said data including the geographic position of track segments and the heading of track segments;

(c) tachometer measuring the revolutions of one or more of the wheels of the vehicle for providing the position of the vehicle along the track;

(d) a gyro for providing the change in heading of the vehicle; and, (e) filter which receives the signals indicating the geographic location, the position of the vehicle along the track, the heading of the vehicle and the track database to provide an estimate of the error in said geographic position the error in said heading and the error in said position of the vehicle along the track to determine the track position of the vehicle;

(f) means for transmitting via a wireless link said identification and said track position;

(g) means for receiving wireless signals from other vehicles, said wireless signals including the identifications and track positions of said other vehicles;

(h) means for determining the distance along said track layout between said vehicle and said other vehicles; and (i) means for initiating an alarm if the determined distance is less than a predetermined amount.

13. The proximity detection system of claim 12 further comprising:

(f) means for automatically initiating a braking action if a crew of the vehicle fails to respond appropriately to the alarm; and, (g) means for automatically disabling said means for automatically initiating a braking action at predetermined locations along said track layout.

14. The proximity detector of claim 1 wherein said safe amount is a predetermined distance.

15. The proximity detector of claim 1 wherein said safe amount is determined, at least in part, from the expected braking distance of said vehicle, said expected braking distance including an assessment of the grade of the track.

16. The proximity detector of claim 2 wherein the means for transmitting and the means for receiving comprise a digital RF communication processor.

17. The proximity detector of claim 1 where the means for determining the distance along said track and the means for initiating an alarm comprise a proximity detection computer.

18. A railway vehicle location determination system comprising:

(a) a satellite positioning system which provides signals indicating the geographic location of the railway vehicle;

(b) a track database which includes data regarding a track layout used by the railway vehicle, said track layout including plural track segments each having an associated mileage point, and said data including a geographic box associated with each mileage point;

(c) a computer which compares the geographic location of the railway vehicle with said geographic boxes to select the geographic box in which the geographic location of the vehicle is located; and (d) a display for displaying the mileage point associated with the selected geographic box.

19. The location determination system of claim 18 wherein the size of said geographic boxes is based on said track layout and the uncertainty of the measurement of the location.

20. The location determination system of claim 18 wherein the size of said geographic boxes are defined by longitude and latitude.

21. A railway vehicle location determination system comprising:

(a) a satellite positioning system which provides signals indicating the approximate geographic location of the railway vehicle;

(b) a track database which includes data regarding the track used by the railway vehicle, said track including all track paths within a specified region of uncertainty for said approximate position, and said data including the geographic position of track segments and the heading of track segments;

(c) a tachometer measuring the revolutions of one or more of the wheels of the vehicle for providing the position of the vehicle along the track;

(d) a gyro for providing the change in heading of the vehicle;

(e) a Kalman filter for each track path within the specified region of uncertainty which receives the signals indicating the geographic location, the position of the vehicle along the track, the heading of the vehicle and the track database to provide an estimate of the error in said geographic position, the error in said heading and the error in said position of the vehicle along the track; and (f) a turn out processor for comparing the turn rate and the heading from said gyro with the turn rate and heading from said track database to determine which of said track paths the vehicle is traveling.

* * * * *